United States Patent
Kuroda et al.

(10) Patent No.: US 7,701,816 B2
(45) Date of Patent: Apr. 20, 2010

(54) INFORMATION REPRODUCING APPARATUS AND METHOD

(75) Inventors: Kazuo Kuroda, Saitama (JP); Toshio Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 361 days.

(21) Appl. No.: 11/907,345

(22) Filed: Oct. 11, 2007

(65) Prior Publication Data

US 2008/0043589 A1    Feb. 21, 2008

Related U.S. Application Data

(63) Continuation of application No. 10/852,487, filed on May 25, 2004, now Pat. No. 7,301,866.

(30) Foreign Application Priority Data

May 26, 2003  (JP) .............................. 2003-147941

(51) Int. Cl.
G11B 7/00 (2006.01)
(52) U.S. Cl. ................................... 369/47.1; 369/47.27
(58) Field of Classification Search ................ 369/47.1, 369/47.27, 44.13, 275.3, 44.26
See application file for complete search history.

(56) References Cited

U.S. PATENT DOCUMENTS

| | | | |
|---|---|---|---|
| 5,703,853 A | * | 12/1997 | Horigome et al. ......... 369/47.28 |
| 6,363,041 B1 | | 3/2002 | Timmermans et al. |
| 7,020,062 B2 | | 3/2006 | Kuroda et al. |
| 7,149,175 B2 | | 12/2006 | Sako et al. |
| 2003/0067858 A1 | | 4/2003 | Kuroda et al. |

FOREIGN PATENT DOCUMENTS

| | | |
|---|---|---|
| EP | 1 207 531 | 5/2002 |
| EP | 1 255 246 | 11/2002 |
| EP | 1 293 971 | 3/2003 |
| JP | 8293157 | 11/1996 |
| JP | 2001216650 | 8/2001 |
| JP | 2002-237138 | 8/2002 |
| JP | 2003022539 | 1/2003 |
| JP | 2003-85896 | 5/2003 |

* cited by examiner

*Primary Examiner*—Nabil Z Hindi
(74) *Attorney, Agent, or Firm*—Drinker Biddle & Reath, LLP

(57) ABSTRACT

A pit data generation circuit generates a first clock signal synchronized with pit data and a pit synchronization signal from a sum read signal obtained by reading the length of a pit. A division circuit generates a second clock signal by frequency-dividing the first clock signal. The division circuit is reset by the pit synchronization signal, and is capable of adjusting the phase of the second clock signal.

5 Claims, 5 Drawing Sheets

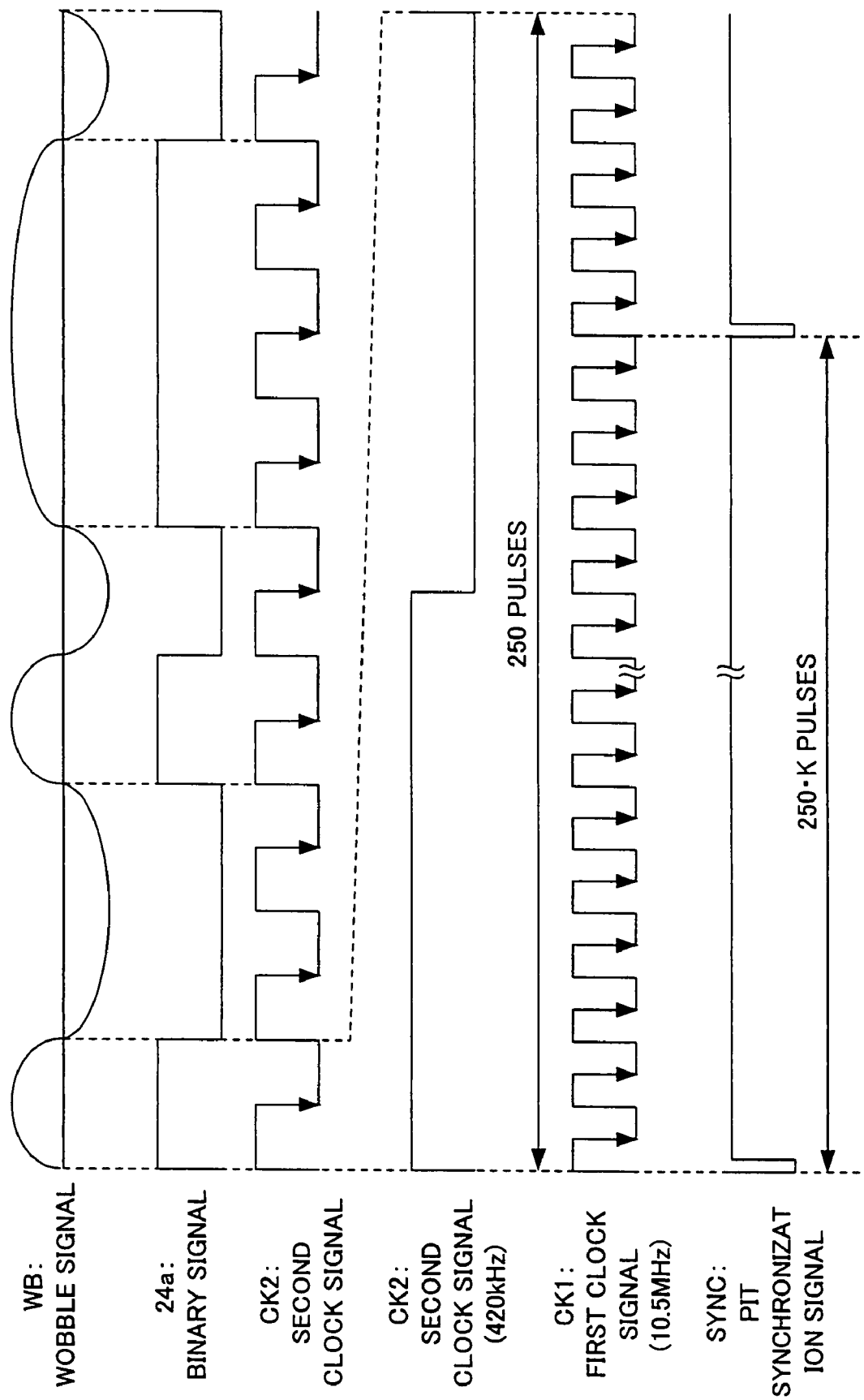

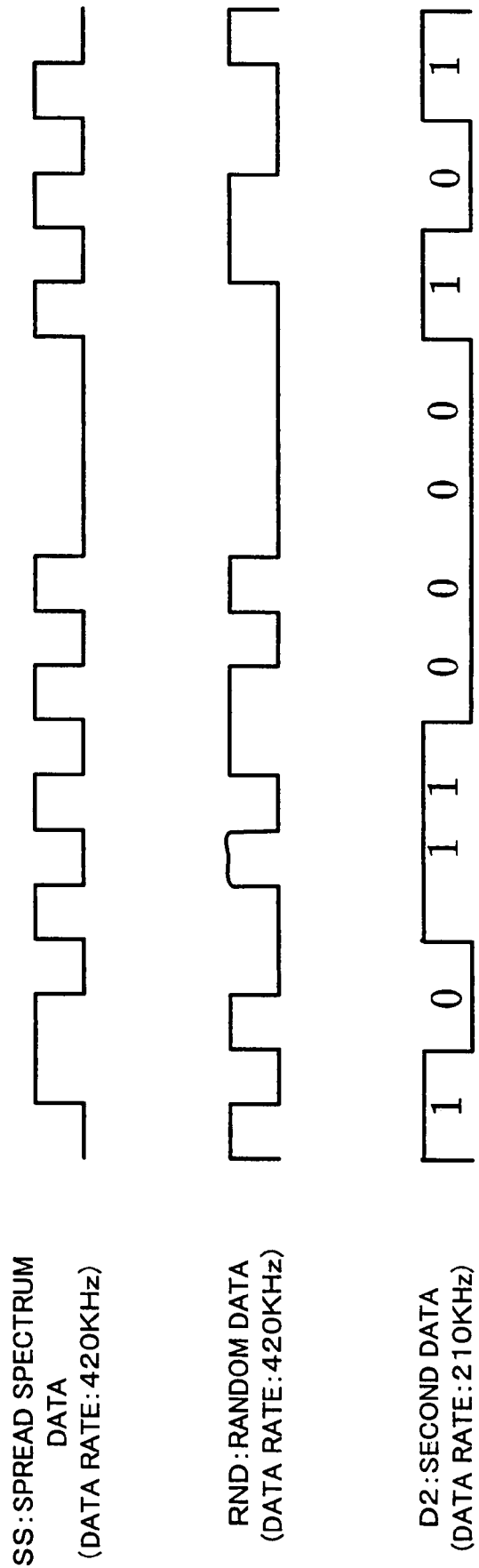

INFORMATION REPRODUCING APPARATUS AND METHOD

This is a continuation application of application Ser. No. 10/852,487, filed on May 25, 2004, now U.S Pat. No. 7,301,866 which is incorporated by reference herein in its entirety.

BACKGROUND OF THE INVENTION

1. Field of the Invention

The present invention relates to an apparatus for and a method of reproducing information from an information recording medium, such as an optical disc.

2. Description of the Related Art

In the optical disc represented by a Compact Disc (CD) and a DVD, the long or short length of a pit is used to record information. However, in order to record information for copy control for the prevention of illegal copying or the like, there is a request for reserving another recording area without decreasing a recording capacity by the pit.

As a method of increasing the recording capacity by other means except the method using the long or short length of the pit, there is known a technique of displacing or shifting the position of the pit in the radial direction of the optical disc. This technique is such that information is recorded by wobbling the position of the pit in the radial direction of the optical disc and by performing spread spectrum with respect to the wobble.

Such a method of reproducing the spread spectrum data from the optical disc is disclosed in Japanese Patent Application Laying Open NO. 2003-85896. This technique is such that a clock signal is extracted from a read signal corresponding to the movement of a pit position aside from a read signal obtained by detecting the length of the pit, and that data is reproduced by using the extracted clock signal.

However, the structure of an information reproducing apparatus becomes complicated if the clock signal is reproduced differently from the read signal obtained by detecting the length of the pit. Also if the clock signal is reproduced from the read signal corresponding to the movement of the pit position, it is influenced by the eccentricity of the optical disc, which increases a jitter component and an error rate.

SUMMARY OF THE INVENTION

It is therefore an object of the present invention to provide an information reproducing apparatus for and an information reproducing method of decreasing the error rate in the reproduction of data recorded by the wobble, as one example.

The above object of the present invention can be achieved by an information reproducing apparatus for reproducing information recorded on an information recording medium, on which a record mark having a variable length according to first data is formed at a displaced position to which the record mark is displaced in a direction crossing a reading direction of the record mark according to a wobble signal obtained by modulating second data in a predetermined modulating method, the information reproducing apparatus comprising: a reading device for reading the record mark recorded on the information recording medium; a read signal generating device for generating a read signal for indicating the length of the record mark on the basis of an output signal from the reading device; a first clock signal generating device for generating a first clock signal on the basis of the read signal; a wobble signal generating device for generating a wobble signal for indicating the displaced position of the read mark on the basis of the output signal from the reading device; and a second data reproducing device for reproducing the second data from the generated wobble signal by using the first clock signal.

The above object of the present invention can be also achieved by an information reproducing method of reproducing information recorded on an information recording medium, on which a record mark having a variable length according to first data is formed at a displaced position to which the record mark is displaced in a direction crossing a reading direction of the record mark according to a wobble signal obtained by modulating second data in a predetermined modulating method, the information reproducing method comprising: a reading process of reading the record mark recorded on the information recording medium; a read signal generating process of generating a read signal for indicating the length of the record mark on the basis of an output signal read by the reading process; a first clock signal generating process of generating a first clock signal on the basis of the read signal; a wobble signal generating process of generating a wobble signal for indicating the displaced position of the read mark on the basis of the output signal read by the reading process; and a second data reproducing process of reproducing the second data from the generated wobble signal by using the first clock signal.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 4 is a timing chart showing the relationship among a wobble signal WB, a binary signal 24a, a first clock signal CK1, a second clock signal CK2, and a pit synchronization signal SYNC; and FIG. 5 is a timing chart showing the relationship among spread spectrum data SS, random data RND, and second data D2.

DETAILED DESCRIPTION OF THE PREFERRED EMBODIMENT

Figure 1:
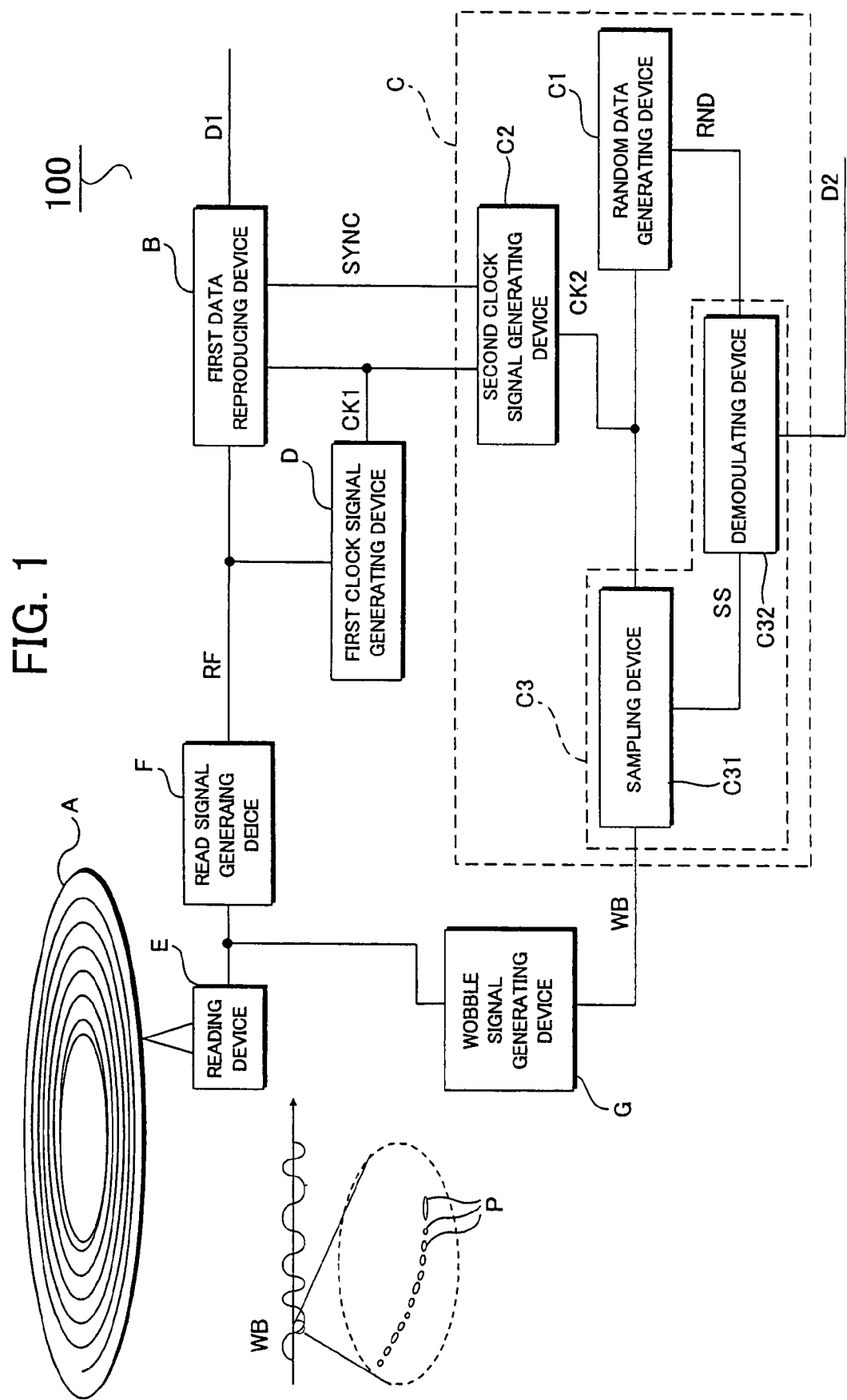
FIG. 1 is a block diagram showing the outline structure of an information reproducing apparatus associated with an embodiment of the present invention.

The preferred embodiment of the present invention will be explained with reference to one of the drawings hereinafter. FIG. 1 shows the main portion of an information reproducing apparatus associated with an embodiment of the present invention. This information reproducing apparatus 100 reproduces an information recording medium A thereon. The information recording medium A is disc-shaped and can adopt various optical discs, such as a CD, a Compact Disc-Read Only Memory (CD-ROM), a DVD, and a DVD-ROM.

On the information recording medium A, record marks are formed along circular tracks as pits P. First data D1 is recorded according to the variable length (i.e., the long or short length) of the record mark. The track, in close-up, meanders or wobbles in the direction crossing a reading direction. This meandering or wobbling of the track is referred to as the "wobble" and has a shape corresponding to a wobble signal WB. The wobble signal WB is obtained by modulating second data D2 in a predetermined modulating method. In other words, the record mark is formed at a position displaced in the direction crossing the reading direction according to the wobble signal WB. The embodiment adopts a spread spectrum modulating method as the predetermined modulating method. Incidentally, the first data D1 is synchronized with the second data D2 upon recording. Moreover, the first data D1 is synchronized with the wobble signal WB.

The information reproducing apparatus 100 is provided with: a reading device E; a read signal generating device F; a wobble signal generating device G; a first data reproducing device B; a second data reproducing device C; and a first clock signal generating device D. The reading device E reads the record mark recorded on the information recording medium A. The read signal generating device F generates a read signal RF for indicating the long or short length of the record mark on the basis of an output signal from the reading device E. The first clock signal generating device D generates a first clock signal DK1 from the read signal RF. The read signal RF is a signal obtained by reading the long or short length of the record mark recorded on the information recording medium A. The minimum reverse interval of the first data D1 is M times as long as one cycle of the first clock signal CK1.

The wobble signal generating device G generates the wobble signal WB for indicating the displaced position of the read mark on the basis of the output signal from the reading device E. The first data reproducing device B reproduces the first data D1 from the read signal RF by using the first clock signal CK1. The second data reproducing device C reproduces the second data D2 by performing predetermined processing using the first clock signal CK1 with respect to the generated wobble signal WB. Namely, it generates the second data D2 from the wobble signal WB by using the first clock signal CK1 reproduced from the long or short length of the record mark. In the reproduction of digital information, it is general to generate a clock signal from a wobble signal. Therefore, it is conceivable to reproduce a clock signal for extracting the second data D2 from the reproduced wobble signal WB.

However, providing a reproduction circuit independently of the first clock signal generating device D makes the structure complicated. Moreover, since the wobble signal WB determines the meandering or wobbling of the track, the frequency thereof is lower than that of the record mark. On the other hand, the read signal RF and the wobble signal WB are generated by rotating the disc-shaped information recording medium A upon reproducing. Ideally, it is desirable that there is no eccentricity on the information recording medium A, but actually there is eccentricity to some extent on the information recording medium A. Thus, the read signal RF and the wobble signal WB are influenced by the eccentricity, causing jitter. The wobble signal WB is easily influenced by the jitter because of its low frequency, but the read signal RF has a shorter period and a smaller jitter amount because of its high frequency, which increases accuracy as a sampling clock. That is why the second data D2 is generated from the wobble signal WB by using the first clock signal CK1 extracted from the read signal RF. This allows the simplified structure of the information reproducing apparatus 100 and at the same time allows the reproduction of the second data D2 without almost any influence of the eccentricity, thereby drastically improving the error rate of the second data D2.

The second data reproducing device C is provided with: a random data generating device C1; a second clock signal generating device C2; and a reproducing device C3. The random data generating device C1 is provided with a non-volatile memory or the like in which random data RND used for the spread spectrum of the second data D2 is stored. The second clock signal generating device C2 generates a second clock signal CK2 synchronized with the first clock signal CK1. The second clock signal generating device C2 may have any structure if capable of generating the second clock signal CK2 on the basis of the first clock signal CK1, and may be a Phase Locked Loop (PLL) circuit and a division circuit (e.g., a frequency division circuit), for example. In particular, if the frequency of the first clock signal CK1 is an integral multiple of the frequency of the second clock signal CK2, the division circuit is preferably used from the viewpoint of the simplified structure, and if not, the PLL circuit is preferably used.

The reproducing device C3 reads the random data RND from the random data generating device C1 by using the second clock signal CK2 and reproduces the second data D2 by demodulating the reproduced wobble signal WB on the basis of the read random data RND. Thus, the random data RND is read by using the second clock signal CK2 synchronized with the first clock signal CK1.

Moreover, the reproducing device C3 is provided with a sampling device C31 and a demodulating device C32. The sampling device C31 samples the reproduced wobble signal WB with the second clock signal CK2. The demodulating device C32 reproduces the second data D2 by performing an inverse-spread spectrum (i.e., performing a back-spread or reverse-spread spectrum) with respect to the spread spectrum data SS outputted from the sampling device C31, on the basis of the random data RND read from the random data generating device C1 by using the second clock signal CK2.

Since the wobble signal WB has a lower frequency than that of the read signal RF, the inclination of the wobble signal WB near zero crossing is relatively mild. Therefore, if the wobble signal WB is only binarized by a comparator or the like, the jitter amount is large. In the embodiment, the spread spectrum data SS is extracted by sampling the wobble signal WB with the second clock signal CK2. The spread spectrum data SS is obtained by performing the spread spectrum with respect to the second data D2. Since the second clock signal CK2 is generated from the first clock signal CK2 having the high frequency, it is possible to accurately adjust the phase of the second clock signal CK2 with the cycle of the first clock signal CK1. For example, if the spread spectrum data SS is extracted at the trailing or falling edge of the second clock signal CK2, the spread spectrum data SS may accurately be extracted from the wobble signal WB by adjusting a timing so as to set the trailing edge of the second clock signal CK2 to the center of the data reverse interval (which is the interval while the data is reverted or inverted) of the wobble signal WB.

More specifically, if the data rate of the first data D1 is N times (N: natural number, N≧2) as large as that of the random data RND, the second clock signal generating device C2 is preferably provided with a frequency-division circuit for 1/N-frequency-dividing the first clock signal CK1 (i.e., for dividing the frequency of the first clock signal CK1 by N, to thereby generate a lower frequency clock as the second clock signal CK2). Moreover, the first data reproducing device B preferably outputs a particular signal obtained by extracting a particular data pattern included in the first data D1, and the division circuit is preferably reset by the particular signal or a signal obtained by delaying the particular signal by a predetermined time length. In this case, the particular signal may be the synchronization signal SYNC of the first data D1.

EXAMPLE

Figure 2:
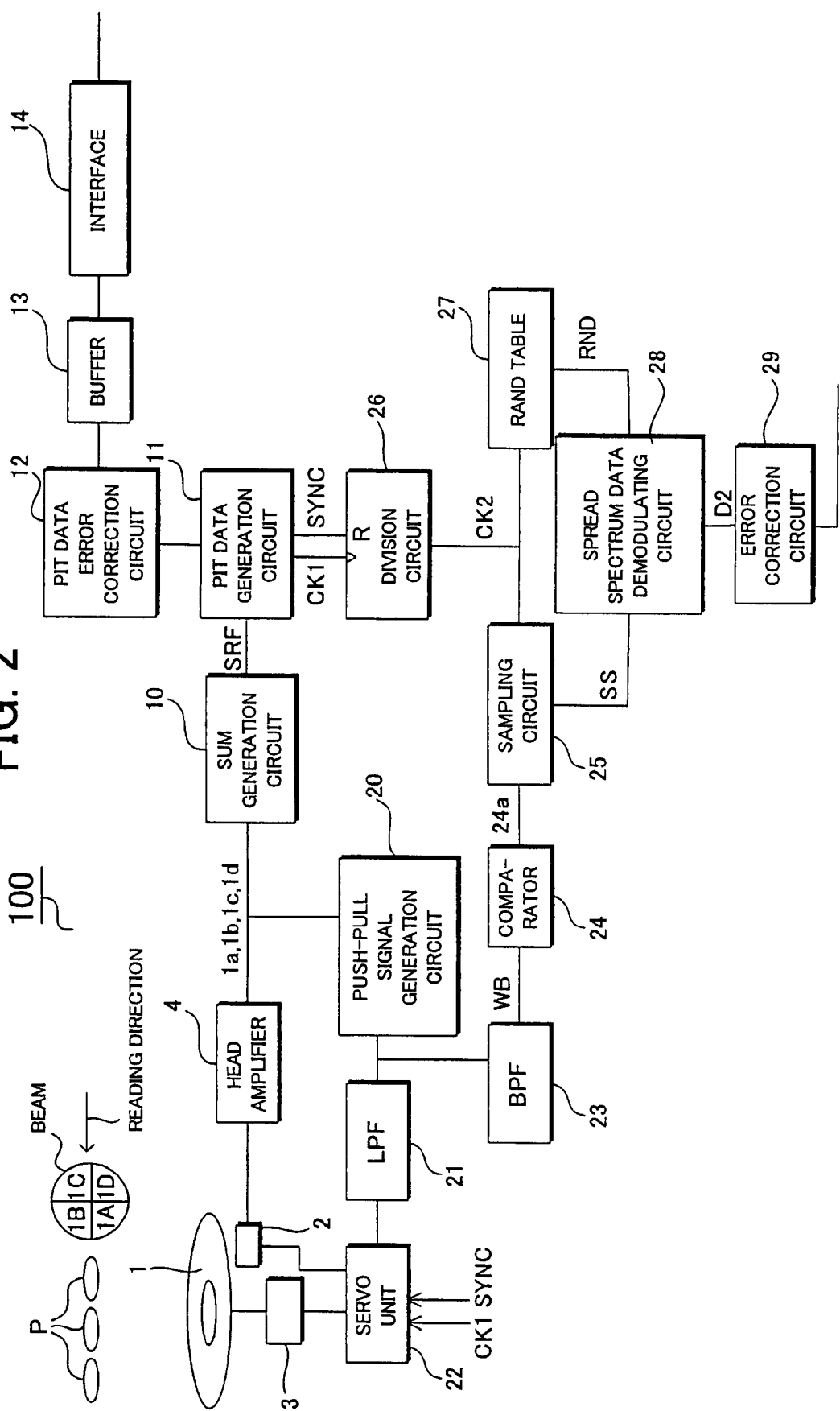
FIG. 2 is a block diagram showing the structure of an information reproducing apparatus associated with an example of the present invention.

Next, the preferred example of the preset invention will be explained with reference to the drawings. FIG. 2 shows the structure of the information reproducing apparatus 100. On an optical disc 1, pit data DP synchronized with the first clock signal CK1 is recorded by the length (i.e., the long or short length) of the record mark. The record mark in this example is a pit, and the track is constructed from a pit row. The track has a meandering or wobbling shape corresponding to the wobble signal WB obtained by the spread spectrum modulation of the second data D2. The wobble signal WB is synchronized with the second clock signal CK2. The first clock signal CK1 has a frequency N times (N: natural number) as large as that of the second clock signal CK2. In this example, N=250, the frequency of the second clock signal CK2 is 420 KHz, and the frequency of the first clock signal CK1 is 10.5 MHz. The pit data DP corresponds to the first data D1 described above, and the optical disc 1 corresponds to the information recording medium A.

The information reproducing apparatus 100 is provided with: an optical pickup 2 for irradiating a reproduction beam onto the optical disc 1 and for outputting a signal corresponding to reflected light; a spindle motor 3 for controlling the rotation of the optical disc 1; and a servo unit 22. The first clock signal CK1 and the pit synchronization signal SYNC are supplied to the servo unit 22. In synchronization with these signals, the servo unit 22 performs spindle servo for controlling the rotation of the spindle motor 3 and focus servo and tracking servo for controlling the relative position of the optical pickup 2 with respect to the optical disc 1.

The optical pickup 2 is provided with: a laser diode for irradiating the reproduction beam; and a four-division detection circuit (not-illustrated). The four-division detection circuit divides by 4 the reflected light of the reproduction beam into areas 1A, 1B, 1C, and 1D shown in FIG. 2, and outputs each signal corresponding to the quantity of light in respective one of the areas. A head amplifier 4 amplifies each output signal of the optical pickup 2, and outputs a divisional read signal 1a corresponding to the area 1A, a divisional read signal 1b corresponding to the area 1B, a divisional read signal 1c corresponding to the area 1C, and a divisional read signal 1d corresponding to the area 1D. The optical pickup 2 and the head amplifier 4 correspond to the reading device E described above.

A sum generation circuit 10 corresponds to the read signal generating device F and is constructed from an addition circuit for adding the divisional read signals 1a, 1b, 1c, and 1d and for outputting a sum read signal SRF. Incidentally, the sum read signal SRF represents the length (i.e., the long or short length) of the record mark and corresponds to the read signal RF described above.

Figure 3:
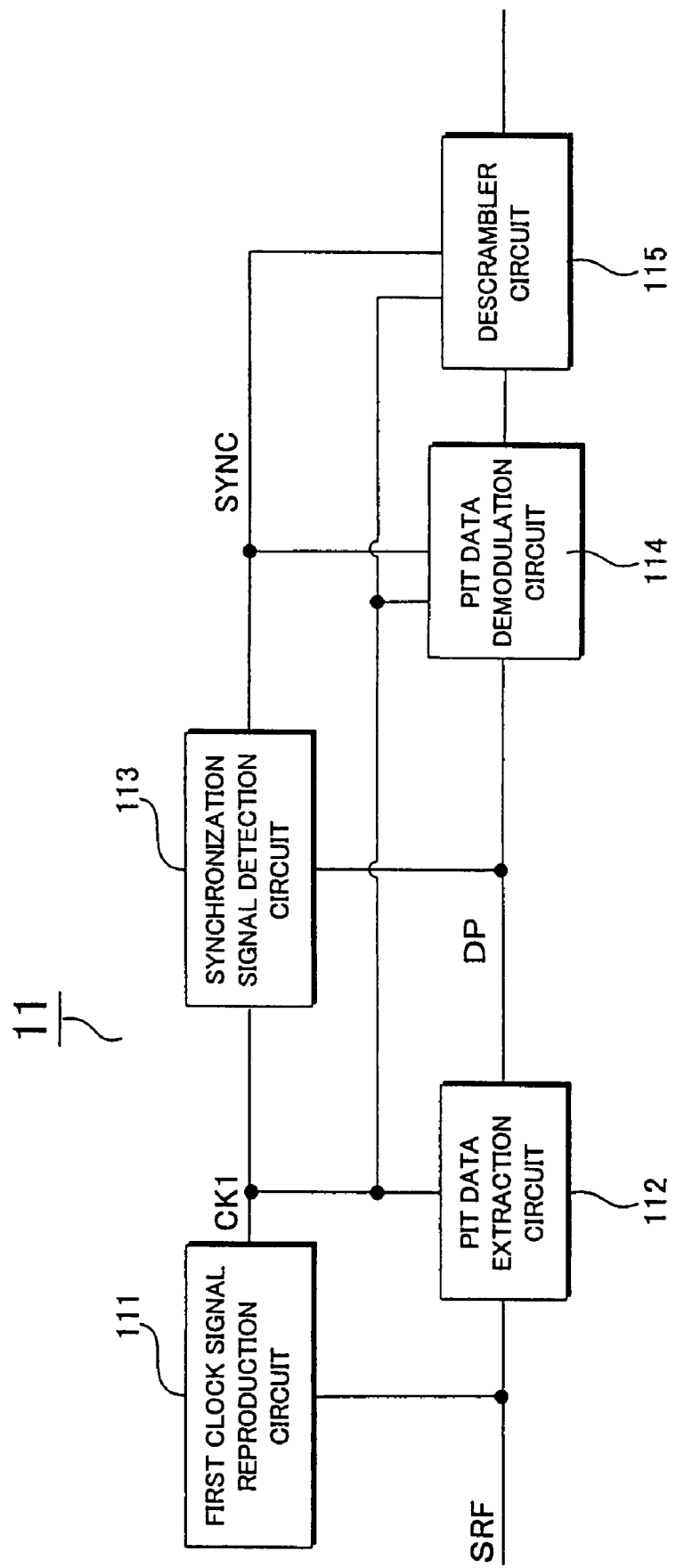
FIG. 3 is a block diagram showing the structure of a pit data generation circuit 11 used for the apparatus.

A pit data generation circuit 11 reproduces the pit data DP and generates the first clock signal CK1 on the basis of the sum read signal SRF. The pit data generation circuit 11 corresponds to the first data reproducing device B and the first clock signal generating device D described above. FIG. 3 shows the structure of the pit data generation circuit 11. As shown in FIG. 3, the pit data generation circuit 11 is provided with: a first clock signal reproduction circuit 111; a pit data extraction circuit 112; a synchronization signal detection circuit 113; a pit data demodulation circuit 114; and a descrambler circuit 115.

The first clock signal reproduction circuit 111 reproduces the first clock signal CK1 synchronized with the pit data DP on the basis of the sum read signal SRF. The pit data extraction circuit 112 samples, with the first clock signal CK1, a binary signal obtained by binarizing the sum read signal SRF and reproduces the pit data DP.

The synchronization signal detection circuit 113 detects a synchronization pattern included in the reproduced pit data DP and generates the pit synchronization signal SYNC. The synchronization pattern is a particular data pattern which is not included in other pit data, and has a constant cycle. The pit synchronization signal SYNC indicates the timing of the synchronization pattern. Incidentally, the pit synchronization signal SYNC in this example is active (at a low level) only in one cycle of the first clock signal CK1 from the beginning of the synchronization pattern.

The pit data demodulation circuit 114 generates reproduction data by demodulating the reproduced pit data DP with a predetermined table, with the pit synchronization signal SYNC being as a reference position. For example, if Eight to Fourteen Modulation (EFM) is used as a modulating method, the demodulation processing is performed in which 14 bits of the pit data DP is converted into 8 bits of the reproduction data. The descrambler circuit 115 performs descrambling in which the order of the reproduction data is rearranged according to a preset rule, and outputs the processed reproduction data.

The reproduction data as obtained above is supplied to a pit data error correction circuit 12 shown in FIG. 2, and after error correcting and interpolating therein, it is stored into a buffer 13. An interface 14 sequentially reads the data stored in the buffer 13, converts it into a predetermined output form, and outputs it to external equipment.

Back in FIG. 2, the explanation goes on. A push-pull signal generation circuit 20 calculates $(1a+1d)-(1b+1c)$ and generates a push-pull signal. The component $(1a+1d)$ corresponds to the areas 1A and 1D which are on the left side with respect to the reading direction, while the component $(1b+1c)$ corresponds to the areas 1B and 1C which are on the right side with respect to the reading direction. Namely, if the reproduction beam inclines to the left side with respect to the pit, the push-pull signal will have positive polarity with the amplitude center thereof as a standard. If the reproduction beam is positioned in the center of the pit, the value of the push-pull signal will be in the amplitude center thereof. If the reproduction beam inclines to the right side with respect to the pit, the push-pull signal will have negative polarity with the amplitude center thereof as a standard. The relative position between the reproduction beam and the pit changes according to the meandering of the track, and the value of the push-pull signal represents the relative position between the reproduction beam and the pit. Namely, the push-pull signal is a signal corresponding to the meandering of the track.

The push-pull signal is outputted through a low pass filter 21 to the servo unit 22. The servo unit 22 performs tracking control on the basis of the push-pull signal. Moreover, the push-pull signal is supplied to a band pass filter 23. The pass band of the band pass filter 23 is set to extract the wobble signal WB obtained by the spread spectrum modulation of the second data D2 upon recording from the push-pull signal. Therefore, the band pass filter 23 constitutes the wobble signal generating device G described above with the push-pull signal generation circuit 20, and the output signal thereof is such as to reproduce the wobble signal WB from the optical disc 1.

FIG. 4 shows the relationship among the wobble signal WB, a binary signal 24a, the first clock signal CK1, the second clock signal CK2, and the pit synchronization signal SYNC. The comparator 24 outputs the binary signal 24a obtained by binarizing the wobble signal WB. Since the wobble signal WB has a low frequency, the inclination thereof near zero crossing is relatively mild. Thus, the binary signal 24a has a large jitter component. The sampling circuit 25 samples the binary signal 24a by using the second clock signal CK2 and reproduces the spread spectrum data SS by extracting the data.

In this example, the frequency f1 of the first clock signal CK1 is 10.5 MHz and the frequency f2 of the second clock signal CK2 is 420 KHz. The first clock signal CK1 has a frequency 250 times as large as that of the second clock signal CK2. Thus, the division circuit 26 generates the second clock signal CK2 by frequency-dividing the first clock signal CK1 by 250. Therefore, as shown in FIG. 4, one cycle of the second clock signal CK2 can contain therein 250 first clock signals CK1. The division circuit 26 is set to be reset if the voltage of a reset terminal R is active (at a low level), and the pit synchronization signal SYNC is supplied to the reset terminal R. Therefore, the second clock signal CK2 is reset by the trailing edge of the pit synchronization signal SYNC, and its phase is determined from the pit synchronization signal SYNC.

The synchronization patterns are inserted in the pit data DP with a period of 250*K (K: natural number) bits, and each has such a relationship that the beginning of the synchronization pattern agrees with the leading or rising edge of the second clock signal CK2. Namely, the synchronization pattern has a frequency which is a natural multiple of that of the second clock signal CK2. In this case, if the pit synchronization signal SYNC becomes active at the timing shown in FIG. 4, the division circuit 26 is reset and the phases of the pit synchronization signal SYNC and the second clock signal CK2 are adjusted. This makes it possible to set the trailing edge of the second clock signal CK2 to the center of the data minimum reverse interval of the binary signal 24a. Therefore, even if the edge of the binary signal 24a is influenced and wobbled by jitter, it is possible to certainly extract the spread spectrum data SS.

Back in FIG. 2, the explanation goes on. A random pattern used for the spread spectrum modulation upon recording is stored on a RAND table 27. The random pattern corresponds to a spread code and is a bit row generated by using a random function. The second clock signal CK2 is supplied to the RAND table 27. By reading the random pattern in synchronization with the second clock signal CK2, the random data RND is generated. The generated random data RND is supplied to a spread spectrum data demodulation circuit 28. Moreover, the spread spectrum data SS outputted from the sampling circuit 25 is also supplied to the spread spectrum data demodulation circuit 28. Incidentally, the division circuit 26 corresponds to the second clock signal generating device C2. The comparator 24 and the sampling circuit 25 correspond to the sampling device C31. The spread spectrum data demodulation circuit 28 corresponds to the demodulating device C32. The RAND table 27 corresponds to the random data generating device C1.

FIG. 5 shows the relationship among the spread spectrum data SS, the random data RND, and the second data D2. The spread spectrum data demodulation circuit 28 is constructed from a multiplication circuit (e.g. an eXclusive OR (XOR) circuit) and reproduces the second data D2 by multiplying the spread spectrum data SS and the random data RND. In this case, a signal which is not in an original signal band is converted into a signal which is out of the band by the multiplication. The second data D2 reproduced in this manner is outputted after error correcting on the error correction circuit 29.

The present invention is not limited to the above-described example and can adopt the following modification, for example. In the above example, the sampling circuit 25 samples the binary signal 24a with the second clock signal CK2 and reproduces the spread spectrum data SS, but instead of the second clock signal CK2, the first clock signal CK1 may be used for the sampling, and data after the sampling may be corrected. In this case, the sampling circuit 25 may supply the data after the sampling to the spread spectrum data demodulation circuit, demodulate the spread spectrum, and then correct it by using the second clock signal CK2 or the like. The point is any method may be used if the second data D2 is reproduced by performing predetermined processing using the first clock signal CK1 with respect to the wobble signal WB reproduced from the optical disc 1 as being the information recording medium A.

Moreover, when the second data D2 with respect to which the spread spectrum is performed is recorded onto the information recording medium A, it is also possible to prepare a plurality of random patterns, select one of the plurality of random patterns according to a predetermined rule, generate the wobble signal WB by the spread spectrum modulation of the second data D2 by using the selected random pattern, and form the record mark at a displaced position, to which it is displaced in the direction crossing the reading direction according to the generated wobble signal WB. If the second data D2 is reproduced from such an information recording medium A, what is needed is to prepare a plurality of RAND tables 27 and demodulate the spread spectrum data SS by using the random data RND selectively read from the RAND tables 27 according to a predetermined rule.

Moreover, in the above example, the case where the beginning of the synchronization pattern of the pit data DP agrees with the timing of the leading edge of the second clock signal CK2 is explained as one example. If the synchronization pattern of the pit data DP does not agree with the timing of the trailing edge of the second clock signal CK2 only by a predetermined number of the first clock signals CK1, the division circuit 26 may be reset in the following manner. Namely, if the pit synchronization signal SYNC becomes active, a counter for starting to count the first clock signals CK1 and a comparison circuit for comparing the counted value of the counter with the predetermined number may be provided, and the division circuit 26 may be reset at a timing at which the agreement is detected on the comparison circuit. In this case, the division circuit 26 is reset by a signal obtained by delaying the pit synchronization signal SYNC by a predetermined time length.

The present invention may be such as to extract a particular data pattern from the pit data DP and adjust the phase of the second clock signal CK2 on the basis of a particular signal (synchronization signal) extracted upon reproducing, and is preferably such as to adjust it by the unit of one period of the first clock signal CK1.

As explained above, according to the above example and modified example, if the second data D2 is reproduced from the information recording medium A on which the pit data DP is recorded according to the length (i.e., the long or short length) of the record mark and on which the record mark is formed at a displaced position to which it is displaced in the direction crossing the reading direction according to the wobble signal WB obtained by the modulation of the second data D2 in a predetermined modulating method, the first clock signal CK1 synchronized with the pit data DP is reproduced from a signal obtained by reading the long or short length of the record mark and this first clock signal CK1 is used to reproduce the second data D2. Therefore, it is possible to make it unnecessary to generate the second clock signal CK2 from the reproduced wobble signal WB and at the same time it is possible to accurately extract the spread spectrum data SS, and thus it is possible to drastically decrease the error rate of the second data D2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-147941 filed on May 26, 2003 including the specification, claims, drawings and summary is incorporated herein by reference in its entirety.

What is claimed is:

1. An information reproducing apparatus for reproducing information recorded on an information recording medium, on which a record mark having a variable length according to first data is formed at a displaced position to which the record mark is displaced in a direction crossing a reading direction of the record mark according to a wobble signal obtained by modulating second data in a predetermined modulating method, said information reproducing apparatus comprising:
a reading device for reading the record mark recorded on said information recording medium;
a read signal generating device for generating a read signal for indicating the length of the record mark on the basis of an output signal from said reading device;
a first clock signal generating device for generating a first clock signal on the basis of the read signal;
a wobble signal generating device for generating a wobble signal for indicating the displaced position of the read mark on the basis of the output signal from said reading device;
a first data reproducing device for reproducing the first data from the read signal by using the first clock signal, and for outputting a synchronization signal obtained by extracting a synchronization pattern included in the reproduced first data; and
a second data reproducing device for reproducing the second data from the generated wobble signal by using the first clock signal,
said second data reproducing device comprising:
a second clock signal generating device for generating a second clock signal synchronized with the first clock signal; and
a delaying device for delaying the synchronization signal by a predetermined time length,
the first data and the second data being recorded on the information recording medium such that the synchronization pattern does not agree with a timing of a trailing edge of said second clock signal by a predetermined number.

2. The information reproducing apparatus according to claim 1, wherein
said second clock signal generating device includes a division circuit for 1/N-frequency dividing the first clock signal,
the frequency division circuit is reset by the delayed synchronization signal.

3. The information reproducing apparatus according to claim 1, wherein the predetermined modulating method is a spread spectrum method.

4. The information reproducing apparatus according to claim 1, wherein said delaying device comprises:
a counting device for starting to count said first clock signal if the synchronization signal is detected; and
a comparison circuit for comparing a counted value of said counting device with the predetermined number,
the predetermined time length is a length of time from when said counting device starts to count until when said comparison circuit detects an agreement between the counted value and the predetermined number.

5. An information reproducing method of reproducing information recorded on an information recording medium, on which a record mark having a variable length according to first data is formed at a displaced position to which the record mark is displaced in a direction crossing a reading direction of the record mark according to a wobble signal obtained by modulating second data in a predetermined modulating method, said information reproducing method comprising:
a reading process of reading the record mark recorded on said information recording medium;
a read signal generating process of generating a read signal for indicating the length of the record mark on the basis of an output signal from said reading process;
a first clock signal generating process of generating a first clock signal on the basis of the read signal;
a wobble signal generating process of generating a wobble signal for indicating the displaced position of the read mark on the basis of the output signal from said reading process;
a first data reproducing process of reproducing the first data from the read signal by using the first clock signal, and for outputting a synchronization signal obtained by extracting a synchronization pattern included in the reproduced first data; and
a second data producing process of reproducing the second data from the generated wobble signal by using the first clock signal,
said second data reproducing process comprising:
a second clock signal generating process of generating a second clock signal synchronized with the first clock signal; and
a delaying process of delaying the synchronization signal by a predetermined time length,
the first data and the second data being recorded on the information recording medium such that the synchronization pattern does not agree with a timing of a trailing edge of said second clock signal by a predetermined number.

* * * * *